J. R. CARTER.
WASHING MACHINE.
APPLICATION FILED JAN. 6, 1902.
991,952.
Patented May 9, 1911.
2 SHEETS—SHEET 1.
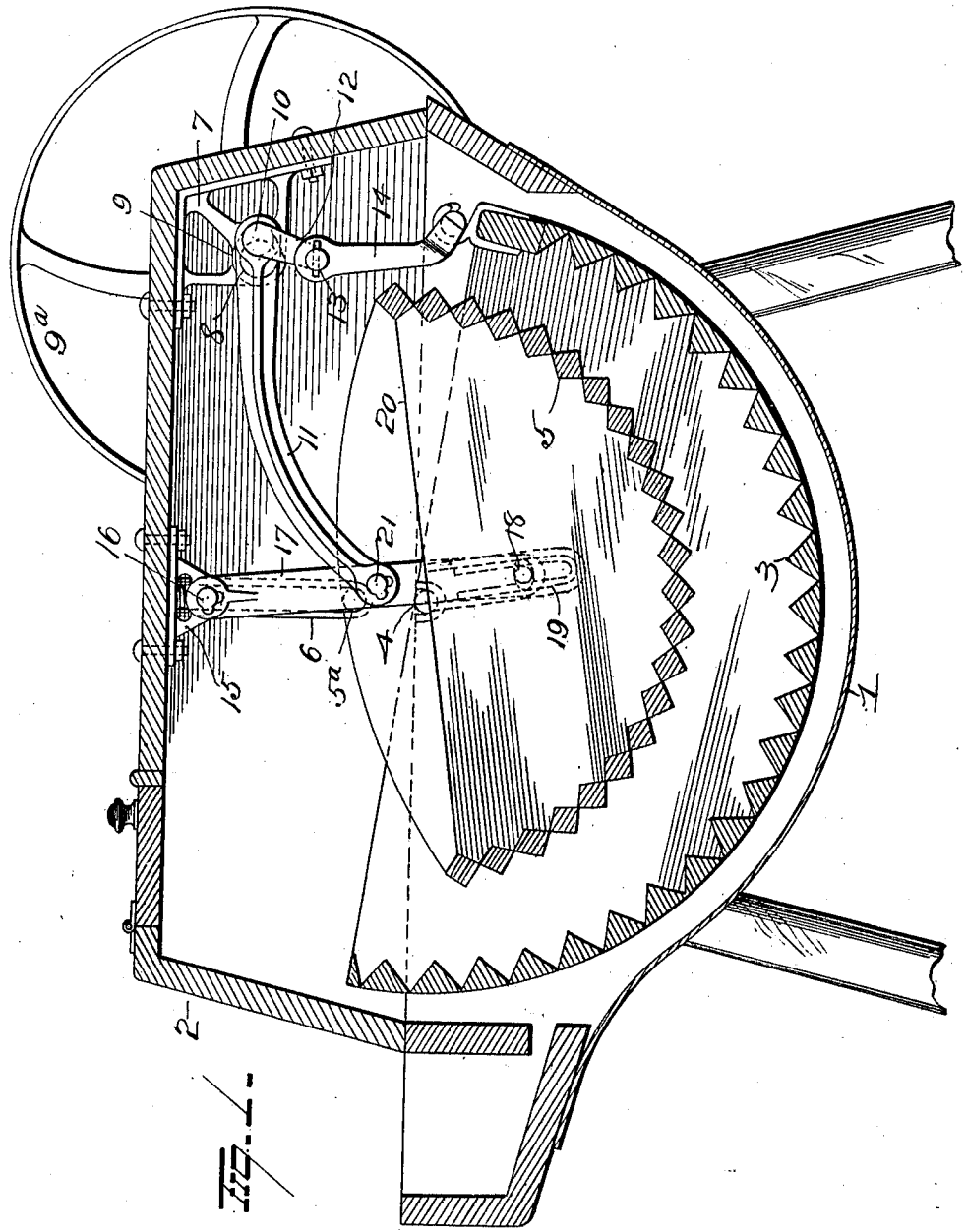
WITNESSES
E. Nottingham
G. F. Downing
INVENTOR
J. R. Carter
By H. A. Seymour
Attorney

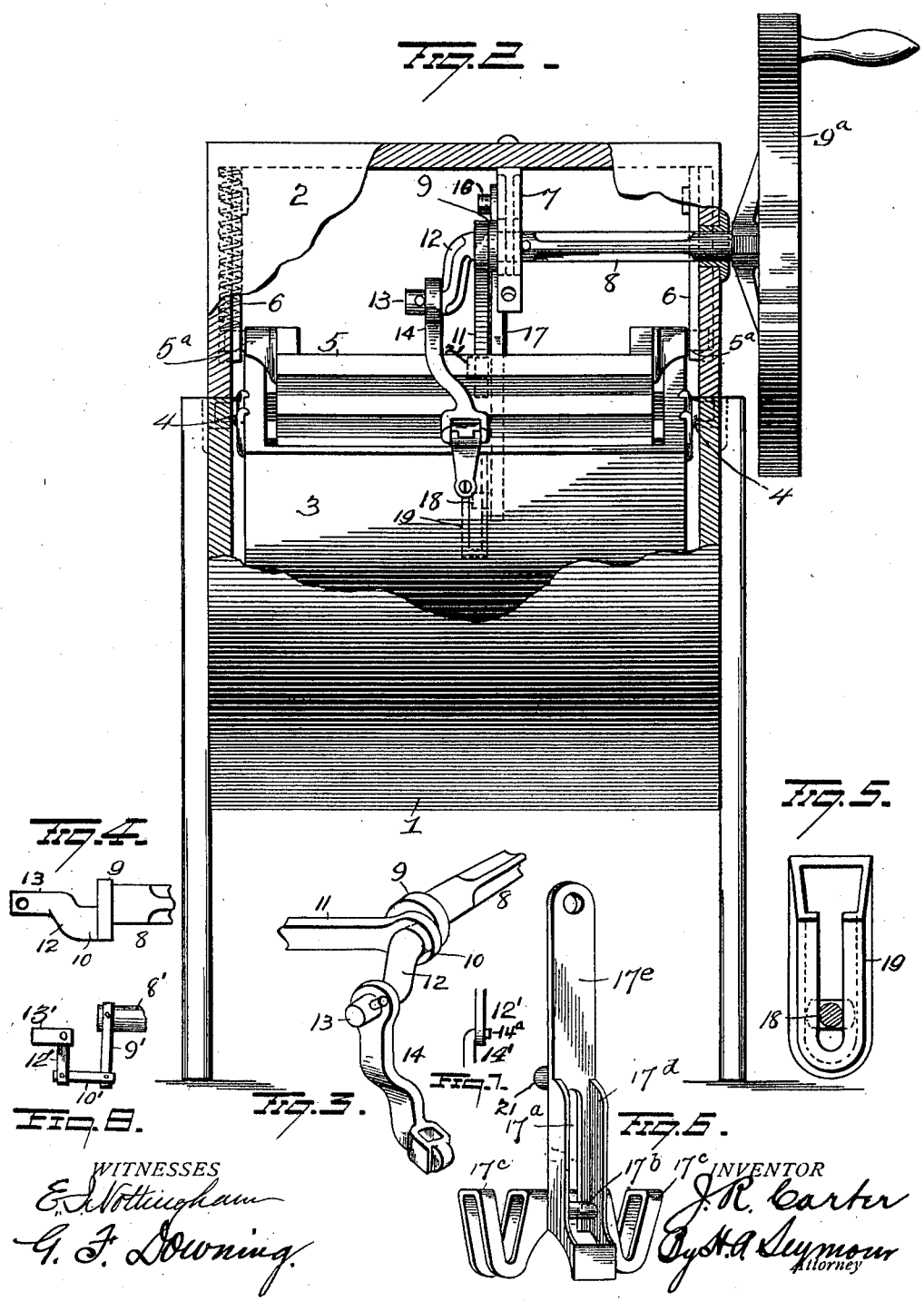

UNITED STATES PATENT OFFICE.

JOHN R. CARTER, OF AUGUSTA, KENTUCKY, ASSIGNOR TO ERNST H. HUENEFELD, OF CINCINNATI, OHIO.

WASHING-MACHINE.

991,952.        Specification of Letters Patent.        Patented May 9, 1911.

Application filed January 6, 1902. Serial No. 88,639.

*To all whom it may concern:*

Be it known that I, JOHN R. CARTER, a resident of Augusta, in the county of Bracken and State of Kentucky, have invented certain new and useful Improvements in Washing-Machines; and I do hereby declare the following to be a full, clear, and exact description of the invention, such as will enable others skilled in the art to which it appertains to make and use the same.

My invention relates to improvements in washing machines, the object of the invention being to provide improved operating mechanism for continuously reciprocating the upper and lower rubbers in opposite directions.

A further object is to provide a washing machine, having upper and lower rubbers, with improved operating mechanism inclosed in the cover of the machine and constructed to reciprocate the rubbers in opposite directions throughout the entire stroke thereof.

With these objects in view, the invention consists in certain novel features of construction and combinations and arrangements of parts as will be more fully hereinafter described and pointed out in the claim.

In the accompanying drawings, Figure 1 is a view in longitudinal vertical section illustrating my improvements. Fig. 2 is a view in end elevation with portions of the machine broken away to show the interior construction. Fig. 3 is a detail perspective view showing the pitmen connections with the crank shaft. Fig. 4 is a view in elevation of the crank shaft. Fig. 5 is a detail view showing the slotted pocket 19 and headed pin 18. Fig. 6 is a perspective view illustrating a modified form of connection between arm or lever 17 and the upper rubber. Figs. 7 and 8 are views of modifications.

1 represents the tub or body of the washing machine, and 2 a cover thereon.

The lower rubber 3 is provided with trunnions 4, mounted in bearings in the body, and the upper rubber 5 is provided with trunnions $5^a$, supported in elongated bearings 6 in the cover, and springs are located in the bearings 6 to exert a yielding pressure on the upper rubber to hold the same down on the articles to be washed.

In the cover 2, a metal bracket 7 is secured and is made with a bearing for a crank shaft 8, extending through one side of the cover, and having a hand wheel $9^a$ (or other operating device) secured on its outer end. On the inner end of shaft 8, a crank arm 9 is located and provided with a crank pin 10 for a pitman 11, and another crank arm 12 is made integral with said crank pin 10, and projects at an angle of about 45 degrees to the arm 9, and has a crank pin 13, at its free end, for a pitman 14. The pins 10 and 13 are so located that as viewed in Fig. 1 if a triangle be formed with the base line running from pin 10 and 13 and the shaft 8 forming the apex of the triangle, such triangle would form an angle at its apex of about 90 degrees, and the pin 13 is located a greater distance from the axis of shaft 8, than pin 10, to give a greater stroke to pitman 14 than is given to pitman 11 to equalize the movement of the upper and lower rubbers, as will be more fully hereinafter pointed out.

Instead of making the shaft 8, arms 9 and 12, and pins 10 and 13 in an integral structure, the structure shown in Fig. 8 may be employed. Thus an arm $9^1$ is secured to shaft $8^1$ and connected by a member $10^1$ with an arm $12^1$, to the free upper end of which latter, a pin $13^1$ is secured. Instead of securing a pin $13^1$ at the end of arm $12^1$, the upper end of pitman $14^1$ may be provided with a pin $14^a$ to enter a hole in arm $12^1$ as shown in Fig. 7.

To the top of cover 2, on its lower or inner face, a bearing 15 is secured, and has mounted therein, a pintle 16 at the upper end of an arm or lever 17. This pintle 16 is preferably made with a lug or key to lock the pintle in the bearing when the washing machine is in operation, and said bearing is provided with a keyway to permit the removal of the pintle when desired to disconnect the arm or lever. A headed pin or lug 18 is provided on the lower end of arm or lever 17, projecting at right angles thereto, and mounted in an elongated slotted pocket 19, secured in the center of an upright 20 made fast in the upper rubber 5. The pocket 19 is preferably made dovetail in cross section so as to be forced into a similarly shaped recess in the upright 20. This pocket 19 may of course be otherwise shaped and secured in various ways, and I might employ a modification such as shown in Fig. 6, in which the arm or lever $17^c$, is provided with an elongated slot $17^a$ to receive a headed pin $17^b$ projecting outward from a bracket 17ᶜ secured on upright 20, and the arm or lever 17ᵉ is provided with an elongated pocket 17ᵈ to house the headed end of pin 17ᵇ. This slotted connection between the arm or lever and upright 20 which is fixed in the upper rubber, permits vertical movement of the upper rubber to make room for varying quantities of articles to be washed and also allows varying positions of the lug or pin in the slot during the movement of the rubber through the arc in which it swings, as the pin moves through an arc of a circle different from the arc through which the pocket moves.

Between the ends of lever or arm 17, a pintle 21 is provided and projects at right angles thereto, and is adapted to lock the pitman 11 (by means of a key on the pintle and notched bearing in the end of pitman 11) to the lever. This pivotal connection of pitman 11 with lever 17, is preferably below the center of lever 17 and below the pivotal support of the rubber so as to receive just the proper leverage and give the arm or lever 17 just the proper throw to exactly equalize the movement of the upper rubber with that of the lower rubber, as the latter is pivotally connected with pitman 14 and the movement of the crank shaft simultaneously reciprocates the upper and lower rubbers in opposite directions.

Heretofore, in the construction of washing machines of the character described, having crank shafts to reciprocate the rubbers, at some point of movement of the crank shaft the rubbers are either at a standstill, or are moving very slowly, or are moved together in the same direction, thus resulting in a waste of energy. With my improvements these defects are all remedied, as it will be seen that the instant the rubbers reach their extreme throw, they immediately begin their reverse movement, and by locating the crank pins and arms in approximately the position shown, or in other words, disposing the crank arms at an angle of about 90 degrees, taking the axis of the shaft as the apex of the angle, the pitmen connections can never be in alinement and are always working to positively push or pull the rubbers, as the case may be, and as the pin 13 is located a greater distance from the axis of the crank shaft than pin 10, it will compensate for the varying arcs through which the upper and lower rubbers move and compel them to move through their different arcs in the same time, but moving in opposite directions.

The diameter of crank pin 10, and consequently the hole or bearing in the end of pitman 11, are appreciably larger than the diameters of arms 12 and crank pin 13, to permit the ready insertion and removal of the pitman 11 by simply sliding the bearing over the arm 12 and pin 13.

Having fully described my invention what I claim as new and desire to secure by Letters-Patent, is:—

In a washing machine, the combination with a body and a cover therefor, a lower rubber mounted to oscillate in the body and an upper rubber mounted in the cover to oscillate, of a crank-shaft supported to rotate within the cover and having its crank arms out of alinement with each other, a pitman connecting one crank arm with the lower rubber, an arm having its upper end pivotally connected with the top of the cover, a movable pivotal connection between the lower end of said arm and the upper rubber, and a pitman pivotally connected at one end to the other crank-arm of the shaft and at its opposite end to the depending arm between the pivotal support of said arm and the connection of its lower end with the upper rubber.

In testimony whereof, I have signed this specification in the presence of two subscribing witnesses.

JOHN R. CARTER.

Witnesses:
S. W. FOSTER,
R. S. FERGUSON.